United States Patent
Wang (10) Patent No.: US 10,412,659 B2
(45) Date of Patent: Sep. 10, 2019

(54) METHODS AND SYSTEMS FOR REGISTRATION MANAGEMENT BETWEEN ELECTRONIC DEVICES

(71) Applicant: Noodoe Corporation, Taipei (TW)

(72) Inventor: John C. Wang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 181 days.

(21) Appl. No.: 15/362,876

(22) Filed: Nov. 29, 2016

(65) Prior Publication Data

US 2017/0215124 A1 Jul. 27, 2017

(30) Foreign Application Priority Data

Jan. 21, 2016 (TW) .............................. 105101819 A (51) Int. Cl.
| | | |
|---|---|---|
| *H04W 40/24* | (2009.01) | |
| *H04W 4/00* | (2018.01) | |
| *H04W 4/70* | (2018.01) | |
| *H04W 84/12* | (2009.01) | |
| *H04W 4/80* | (2018.01) | |

(52) U.S. Cl.
CPC ............ *H04W 40/244* (2013.01); *H04W 4/70* (2018.02); *H04W 4/80* (2018.02); *H04W 84/12* (2013.01)

(58) Field of Classification Search
CPC ......... H04W 4/06; H04W 4/70; H04W 64/00; H04W 84/18; H04W 8/005; H04W 48/16; H04W 4/027; H04W 60/00; H04W 8/02; H04W 28/0215; H04W 48/10; H04W 4/80; H04W 40/244; H04W 84/12; H04W 76/14
See application file for complete search history.

(56) References Cited

U.S. PATENT DOCUMENTS

| | | | | |
|---|---|---|---|---|
| 2003/0020611 A1* | 1/2003 | Script | ................... | G08B 13/08 340/568.1 |
| 2004/0150520 A1* | 8/2004 | Barrie | ................ | G07C 9/00103 340/539.13 |
| 2005/0002347 A1* | 1/2005 | Lee | ...................... | G08G 1/0104 370/312 |

(Continued)

FOREIGN PATENT DOCUMENTS

| | | |
|---|---|---|
| CN | 103368722 A | 10/2013 |
| CN | 103701953 A | 4/2014 |
| CN | 104125342 A | 10/2014 |

*Primary Examiner* — Hoang-Chuong Q Vu
(74) *Attorney, Agent, or Firm* — McClure, Qualey & Rodack, LLP (57) ABSTRACT

Methods and systems for registration management between electronic devices are provided. First, at least one first signal is wirelessly received, and identification data in the first signal is stored. The first signal is broadcasted by at least one first electronic device. Then, at least one second signal is wirelessly received, wherein the second signal is broadcasted by at least one second electronic device. A connection for the second electronic device is established via a wireless network according to identification data in the second signal, and the identification data corresponding to the first electronic device is transmitted to the second electronic device via the wireless network, such that the identification data corresponding to the first electronic device is registered in the second electronic device.

9 Claims, 9 Drawing Sheets

(56) References Cited

U.S. PATENT DOCUMENTS

| | | | | |
|---|---|---|---|---|
| 2008/0293388 | A1* | 11/2008 | Sobieszek | H04M 1/006 |
| | | | | 455/414.1 |
| 2009/0059842 | A1* | 3/2009 | Maltseff | H04W 8/005 |
| | | | | 370/328 |
| 2010/0145479 | A1* | 6/2010 | Griffiths | G01D 21/00 |
| | | | | 700/17 |
| 2011/0098043 | A1* | 4/2011 | Yu | H04W 60/00 |
| | | | | 455/435.1 |
| 2011/0286389 | A1* | 11/2011 | Atarius | H04W 8/183 |
| | | | | 370/328 |
| 2013/0259230 | A1 | 10/2013 | Polo et al. | |
| 2014/0156699 | A1* | 6/2014 | Gray | G06F 17/30477 |
| | | | | 707/769 |
| 2014/0370879 | A1* | 12/2014 | Redding | H04M 3/42178 |
| | | | | 455/419 |
| 2015/0213295 | A1* | 7/2015 | Ginsburg | G06Q 10/00 |
| | | | | 340/10.1 |
| 2016/0227412 | A1* | 8/2016 | Li | H04W 12/08 |
| 2017/0061525 | A1* | 3/2017 | McCoy | G06Q 30/0639 |
| 2018/0293538 | A1* | 10/2018 | Berger | G06Q 10/08 |

* cited by examiner

METHODS AND SYSTEMS FOR REGISTRATION MANAGEMENT BETWEEN ELECTRONIC DEVICES

BACKGROUND OF THE INVENTION

Field of the Invention

The disclosure relates generally to detection management methods and systems, and, more particularly to methods and systems that can register an electronic device to another electronic device via an intermediate electronic device, and perform subsequent detection applications.

Description of the Related Art

Recently, electronic devices, such as smart phones, tablets, notebooks, and other portable devices, have become more and more technically advanced and multifunctional. For example, portable devices have network connectivity capabilities. Users can use their portable devices to connect to networks at anytime and anywhere. The convenience and new functionalities advanced by modern technology have made these devices into necessities of life.

Furthermore, with the coming of IOT (Internet Of Things) generation, every device or object can connect to networks, and users can access and control these devices or objects via networks. The rapid development of IOT is fortunate that the underlying foundation of wireless network technology is already very mature. Electronic devices can readily connect with each other to perform related applications via wireless networks. Additionally, the BLE (Bluetooth Low Energy) technology has solved the prohibitive power consumption issue caused by prolonged connections of electronic devices to wireless networks. For example, a beacon device is a low-cost wireless Bluetooth transmitter implemented with BLE technology, which can transmit Bluetooth signals via a wireless network for a long time. A mobile phone implemented with BLE technology can wirelessly seek Bluetooth signals to discover corresponding beacon device.

Currently, a large amount of innovative applications are developed using beacon devices. In other words, wireless signals corresponding to various applications can exist in the air. The identification data corresponding to beacon devices of an application must be input to an electronic device using the application in advance, such that the electronic device can only handle the wireless signals with the identification data. Conventionally, a user must manually read the identification data from the corresponding beacon devices one by one, and input the obtained identification data to an application in the electronic device. In another conventional art, a user can press a button on the beacon device, thus driving the beacon device to generate the corresponding identification data. At the time, an electronic device can wireless scan related signals to obtain the identification data of the beacon device. Since above conventional arts both need manually operations for the beacon devices one by one, and related users need professional skills to finish the operations, it is inefficient and hard to implement. Further, in some cases, since the electronic device, such as a wearable electronic device may have a small and complicated user interface, it is difficult for users to operate related processes via the user interface of the electronic device. It is difficult and inefficiency to manually input the identification data to the electronic device.

BRIEF SUMMARY OF THE INVENTION

Methods and systems for registration management between electronic devices are provided, wherein an electronic device can be registered to another electronic device via an intermediate electronic device, and subsequent detection applications can be performed.

In an embodiment of a method for registration management between electronic devices for use in an intermediate electronic device, a first signal is wirelessly received from at least one first electronic device, and identification data in the first signal is stored. The first signal is broadcasted by the first electronic device, and the first signal comprises the identification data corresponding to the first electronic device. Then, a second signal is wirelessly received from at least one second electronic device, wherein the second signal is broadcasted by the second electronic device, and the second signal comprises identification data corresponding to the second electronic device. A connection between the second electronic device and the intermediate electronic device is established via a wireless network according to the identification data corresponding to the second electronic device, and the identification data corresponding to the first electronic device is transmitted to the second electronic device via the wireless network, such that the identification data corresponding to the first electronic device is registered in the second electronic device.

An embodiment of a system for registration management between electronic devices for use in an intermediate electronic device comprises a wireless transceiver and a processing unit. The wireless transceiver wirelessly receives a first signal from at least one first electronic device, wherein the first signal is broadcasted by the first electronic device, and the first signal comprises identification data corresponding to the first electronic device. The wireless transceiver wirelessly receives a second signal from at least one second electronic device, wherein the second signal is broadcasted by the second electronic device, and the second signal comprises identification data corresponding to the second electronic device. The processing unit records the identification data corresponding to the first electronic device. The processing unit establishes a connection between the second electronic device and the intermediate electronic device via a wireless network according to the identification data corresponding to the second electronic device, and transmits the identification data corresponding to the first electronic device to the second electronic device via the wireless network, such that the identification data corresponding to the first electronic device is registered in the second electronic device.

In some embodiments, it is determined whether specific information in the first signal conforms to predefined information, wherein the specific information comprises motion information corresponding to the first electronic device, or specific data generated according to the motion information. When the specific information in the first signal conforms to the predefined information, the identification data corresponding to the first electronic device is recorded.

In some embodiments, information corresponding to the second electronic device can be displayed via an interface, and a selection corresponding to the information is received via the interface. In response to the selection, the connection between the second electronic device and the intermediate electronic device is established via a wireless network according to the identification data corresponding to the second electronic device, and the identification data corresponding to the first electronic device is transmitted to the second electronic device via the wireless network.

In some embodiments, the second electronic device performs subsequent processes for the signals having the identification data which is registered in the second electronic device.

In some embodiments, the second electronic device wirelessly receives a specific signal, wherein the specific signal is broadcasted by a specific electronic device, and the specific signal at least includes identification data corresponding to the specific electronic device. The second electronic device determines whether the identification data corresponding to the specific electronic device matches to one of the registered identification data in the second electronic device. When the identification data corresponding to the specific electronic device does not match to one of the registered identification data in the second electronic device, the specific signal is ignored. When the identification data corresponding to the specific electronic device matches to one of the registered identification data in the second electronic device, data in the specific signal is processed. In some embodiments, the data in the specific signal is processed by retrieving a specific management content from a plurality of management contents according to the data in the specific signal, and presenting the specific management content via the second electronic device. In some embodiments, the specific electronic device comprises at least one motion sensor for detecting motion information corresponding to the specific electronic device, wherein the data in the specific signal is generated according to the motion information corresponding to the specific electronic device.

In some embodiments, a wireless connecting unit of the specific electronic device and a wireless connecting unit of the second electronic device respectively have a peripheral mode and a central mode, wherein the specific electronic device broadcasts the specific signal in the peripheral mode, and the second electronic device receives the specific signal in the central mode.

Methods for registration management between electronic devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and system for registration management between electronic devices are provided.

Figure 1:
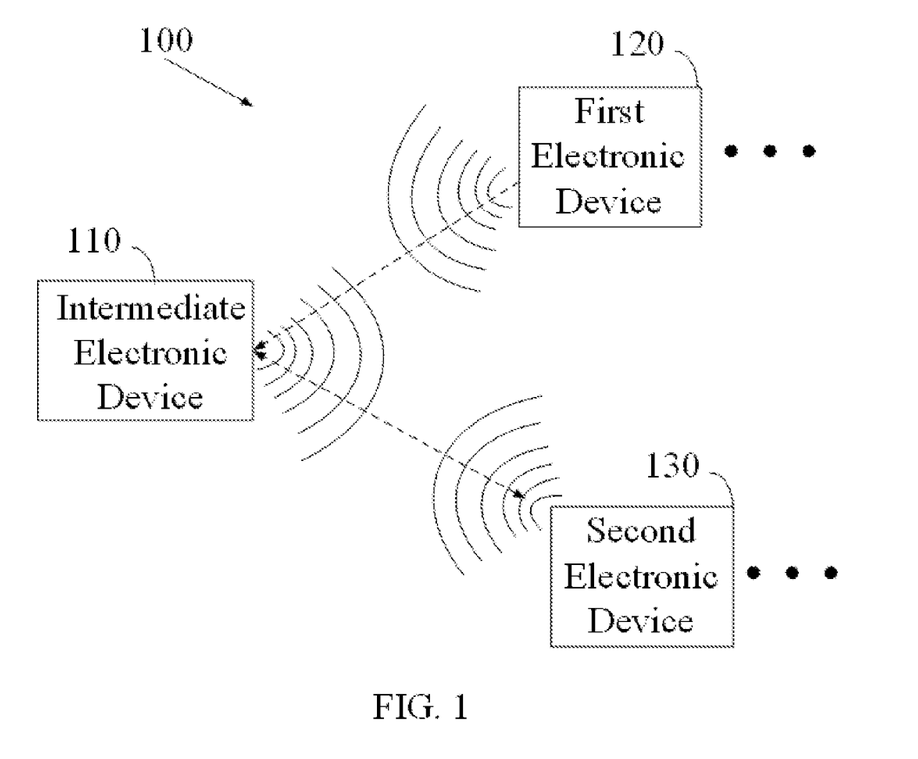
FIG. 1 is a schematic diagram illustrating an embodiment of a system for registration management between electronic devices of the invention.

FIG. 1 is a schematic diagram illustrating an embodiment of a system for registration management between electronic devices of the invention. The system for registration management between electronic devices 100 comprises an intermediate electronic device 110, at least one first electronic device 120, and at least one second electronic device 130. The intermediate electronic device 110 may be a computer or a portable device, such as a mobile phone, a smart phone, a PDA, a GPS, a notebook, or a tablet computer. The first electronic device 120 and the second electronic device 130 can be any electronic device having capabilities for wirelessly receiving and/or transmitting signals. The first electronic device 120 and/or the second electronic device 130 can wirelessly broadcast signals, and the intermediate electronic device 110 can wirelessly receive the signals broadcasted by the first electronic device 120 and/or the second electronic device 130. The intermediate electronic device 110 can wirelessly connect to the first electronic device 120 or the second electronic device 130 via a wireless network, such as a Wi-Fi or a Bluetooth network.

Figure 2:
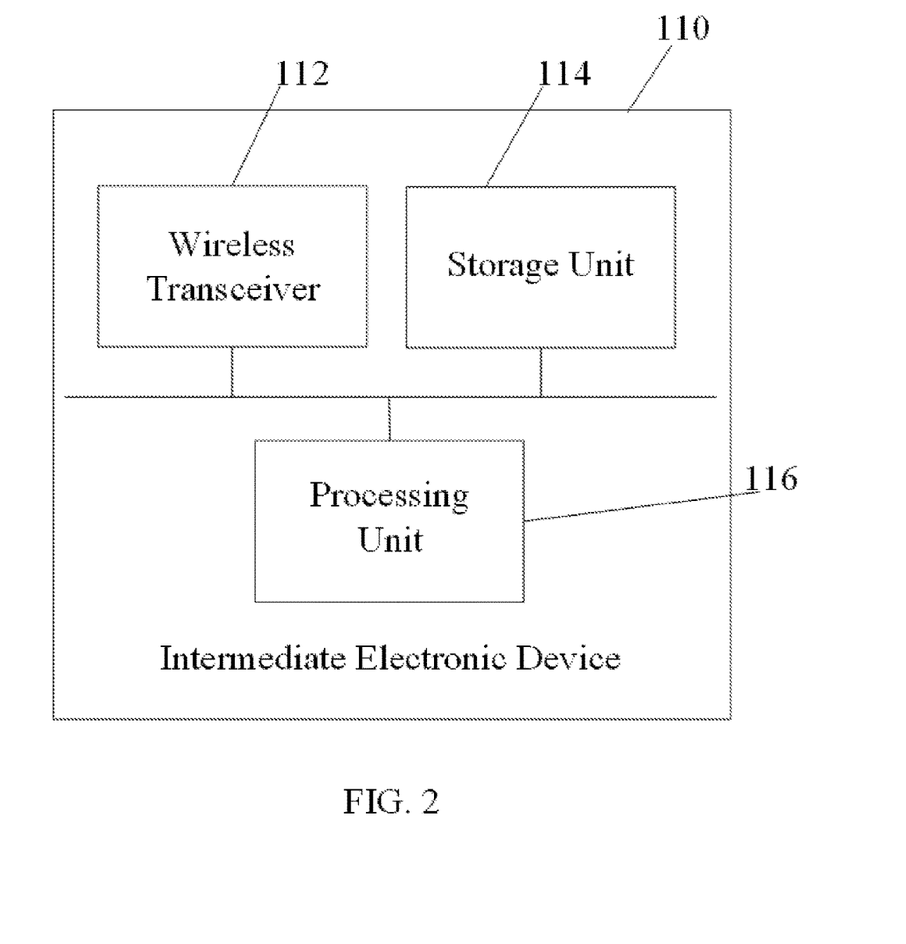
FIG. 2 is a schematic diagram illustrating an embodiment of an intermediate electronic device of the invention.

FIG. 2 is a schematic diagram illustrating an embodiment of an intermediate electronic device of the invention. As described, the intermediate electronic device 110 may be a computer or a portable device, such as a mobile phone, a smart phone, a PDA, a GPS, a notebook, or a tablet computer. As shown in FIG. 2, the intermediate electronic device 110 comprises a wireless transceiver 112, a storage unit 114, and a processing unit 116. The wireless transceiver 112 can wirelessly receive and/or transmit signals. In some embodiments, the wireless transceiver 112 can be a radio transceiver for broadcasting or receiving data in a specific frequency range, such as VHF or UHF. In some embodiments, the wireless transceiver 112 can be a wireless connecting unit for transmitting and receiving data via a wireless network, such as a Wi-Fi or a Bluetooth network, and/or connecting to any electronic device having wireless network connecting capabilities. The storage unit 114 can store related data. The processing unit 116 can control related operations of hardware and software in the intermediate electronic device 110, and perform the methods for registration management between electronic devices of the present invention, which will be discussed later.

It is understood that, as described, the wireless transceiver 112 may be a wireless connecting unit. In some embodiments, the wireless transceiver 112 may be a network connecting unit implemented with a low-power consumption technology, such as Bluetooth Smart technology. The network connecting unit has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the wireless transceiver 112 is in the central mode.

Figure 3:
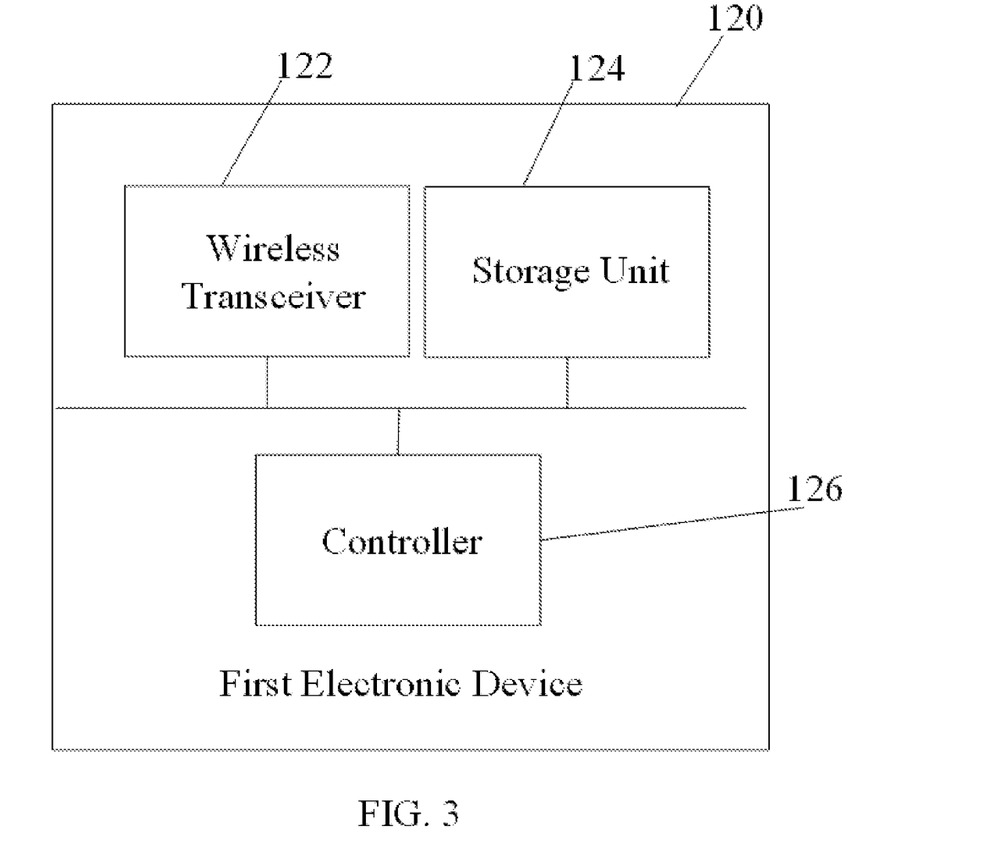
FIG. 3 is a schematic diagram illustrating an embodiment of a first electronic device of the invention.

FIG. 3 is a schematic diagram illustrating an embodiment of a first electronic device of the invention. As shown in FIG. 3, the first electronic device 120 comprises a wireless transceiver 122, a storage unit 124, and a controller 126. The wireless transceiver 122 can wirelessly receive and/or transmit signals. In some embodiments, the wireless transceiver 122 can be a radio transceiver for broadcasting or receiving data in a specific frequency range, such as VHF or UHF. In some embodiments, the wireless transceiver 122 can be a wireless connecting unit for transmitting and receiving data via a wireless network, such as a Wi-Fi or a Bluetooth network, and/or connecting to any electronic device having wireless network connecting capabilities. It is understood that, in some embodiments, the wireless transceiver 122 may be a network connecting unit implemented with a low-power consumption technology, such as Bluetooth Smart technology. The network connecting unit has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the wireless transceiver 122 is in the peripheral mode. In other words, the wireless transceiver 122 has data broadcasting capabilities, and the wireless transceiver 122 cannot actively connect to other electronic devices, wherein the wireless transceiver 122 can be passively connected to other electronic devices. The storage unit 124 can store related data, such as identification data corresponding to the first electronic device 120, or related records generated by the first electronic device 120. The controller 126 can control related operations of hardware and software in the first electronic device 120.

It is understood that, in some embodiments, the first electronic device 120 can further comprise a motion sensor (not shown in FIG. 3) for detecting a posture and/or motion corresponding to the first electronic device 120, and accordingly generating motion information. It is understood that, in some embodiments, the motion sensor may be an accelerometer for generating information of velocity and displacement when the device moves. In some embodiments, the motion sensor may be a Gyro sensor for generating information of angular acceleration when the device moves. It is noted that, the above sensors are only examples of the present application, and the present invention is not limited thereto. Any sensor that can detect the posture and/or motion of an electronic device can be applied in the present invention.

Figure 4:
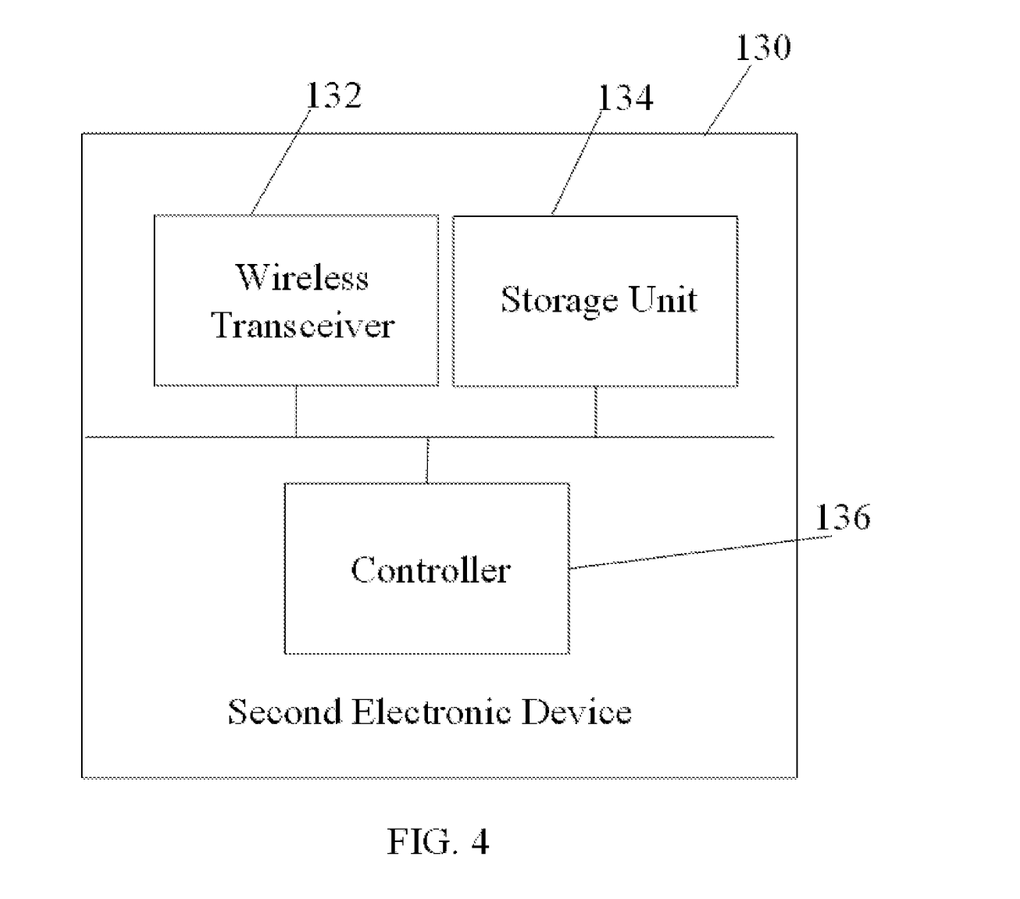
FIG. 4 is a schematic diagram illustrating an embodiment of a second electronic device of the invention.

FIG. 4 is a schematic diagram illustrating an embodiment of a second electronic device of the invention. As shown in FIG. 4, the second electronic device 130 comprises a wireless transceiver 132, a storage unit 134, and a controller 136. The wireless transceiver 132 can wirelessly receive and/or transmit signals. In some embodiments, the wireless transceiver 132 can be a radio transceiver for broadcasting or receiving data in a specific frequency range, such as VHF or UHF. In some embodiments, the wireless transceiver 132 can be a wireless connecting unit for transmitting and receiving data via a wireless network, such as a Wi-Fi or a Bluetooth network, and/or connecting to any electronic device having wireless network connecting capabilities. It is understood that, in some embodiments, the wireless transceiver 132 may be a network connecting unit implemented with a low-power consumption technology, such as Bluetooth Smart technology. The network connecting unit has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. It is understood that, in some embodiments, the second electronic device 130 can actively switch its operation mode between the peripheral mode and the central mode, or in response to an instruction received from another electronic device, such as the above intermediate electronic device 110. The storage unit 134 can store related data, such as identification data corresponding to the second electronic device 130, or related records generated by the second electronic device 130. The controller 136 can control related operations of hardware and software in the second electronic device 130.

Figure 5:
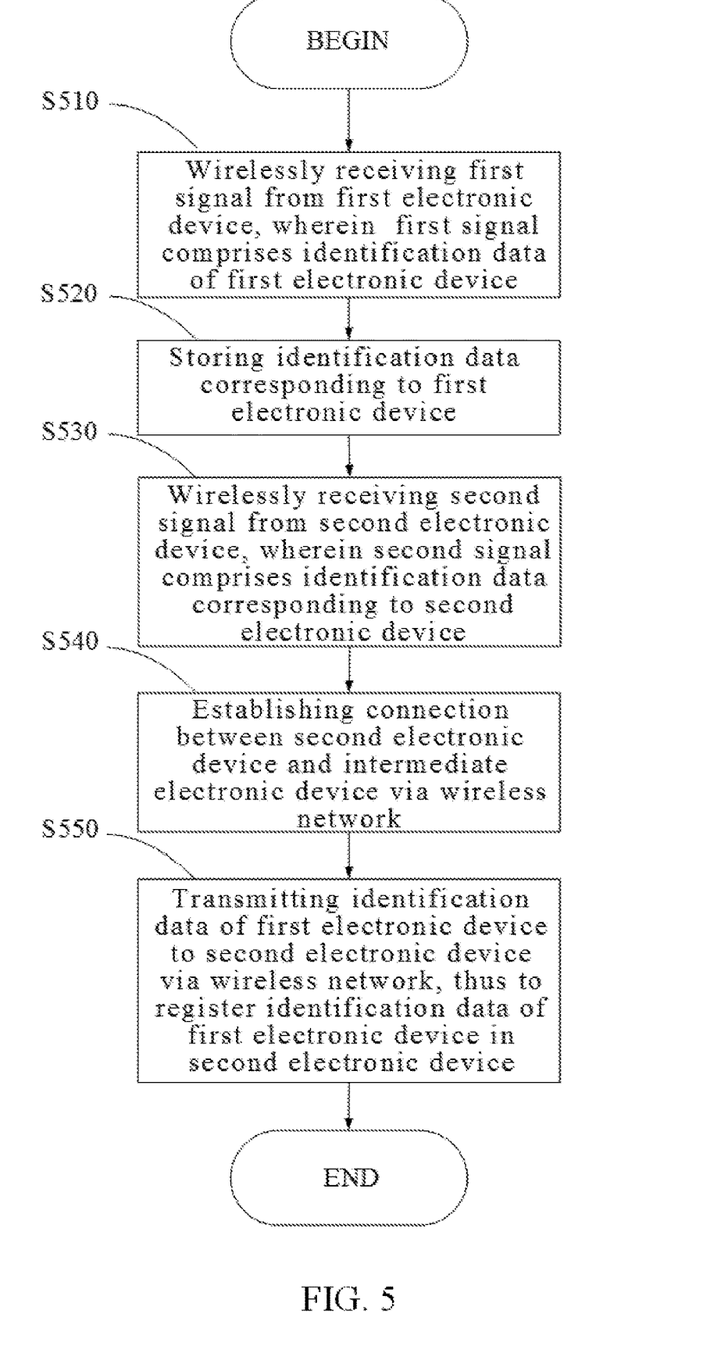
FIG. 5 is a flowchart of an embodiment of a method for registration management between electronic devices of the invention.

FIG. 5 is a flowchart of an embodiment of a method for registration management between electronic devices of the invention. The method for registration management between electronic devices can be used in an intermediate electronic device, such as a computer or a portable device, such as a mobile phone, a smart phone, a PDA, a GPS, a notebook, or a tablet computer.

In step S510, the intermediate electronic device wirelessly receives a first signal. It is noted that, the first signal is broadcasted or transmitted by at least one first electronic device, and the first signal comprises identification data corresponding to the first electronic device. It is understood that, in some embodiments, a wireless connecting unit of the intermediate electronic device and a wireless connecting unit of the first electronic device respectively have a peripheral mode and a central mode, wherein the first electronic device broadcasts the first signal in the peripheral mode, and the intermediate electronic device receives the first signal in the central mode. In step S520, the identification data corresponding to the first electronic device in the first signal is recorded. In step S530, the intermediate electronic device wirelessly receives a second signal. It is noted that, the second signal is broadcasted or transmitted by at least one second electronic device, and the second signal comprises identification data corresponding to the second electronic device. It is understood that, in some embodiments, a wireless connecting unit of the intermediate electronic device and a wireless connecting unit of the second electronic device respectively have a peripheral mode and a central mode, wherein the second electronic device broadcasts the second signal in the peripheral mode, and the intermediate electronic device receives the second signal in the central mode. In step S540, the intermediate electronic device establishes a connection between the second electronic device and the intermediate electronic device via a wireless network according to the identification data corresponding to the second electronic device, and in step S550, transmits the identification data corresponding to the first electronic device to the second electronic device via the wireless network, thereby registering the identification data corresponding to the first electronic device in the second electronic device. It is noted that, the second electronic device can record registered identification data, and only perform further processes for the signals having the registered identification data.

It is understood that, in some embodiments, the first signal broadcasted by the first electronic device can further comprise specific information corresponding to the first electronic device. The specific information may be motion information corresponding to the first electronic device. It is understood that, in some embodiments, the motion information comprises a specific motion or a specific posture detected by at least one motion sensor of the first electronic device. In some embodiments, the first electronic device can generate specific data according to the motion information detected by the motion sensor, and wirelessly broadcast or transmit the generated specific data. In other words, the specific information can comprise the specific data generated according to the motion information of the first electronic device.

Figure 6:
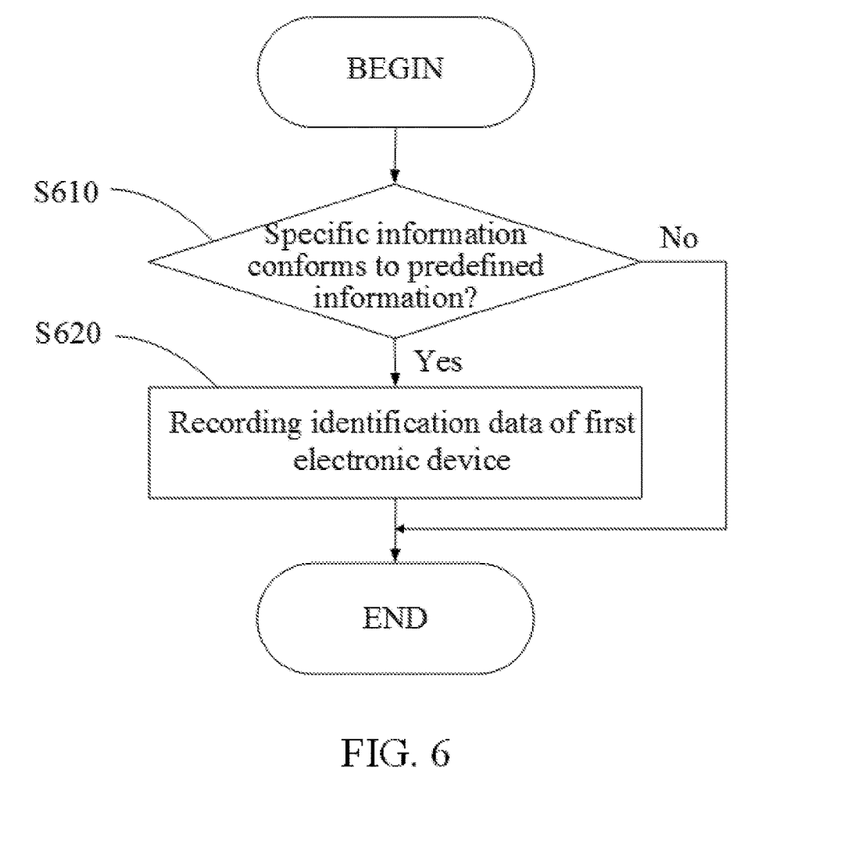
FIG. 6 is a flowchart of another embodiment of a method for registration management between electronic devices of the invention.

FIG. 6 is a flowchart of another embodiment of a method for registration management between electronic devices of the invention. The method for registration management between electronic devices can be used in an intermediate electronic device, such as a computer or a portable device, such as a mobile phone, a smart phone, a PDA, a GPS, a notebook, or a tablet computer. In the embodiment, only the identification data in a signal having predefined information can be recorded.

In step S610, it is determined whether specific information in the first signal conforms to predefined information preset in the intermediate electronic device. As described, the specific information can comprise motion information corresponding to the first electronic device. It is understood that, in some embodiments, the motion information comprises a specific motion or a specific posture detected by at least one motion sensor of the first electronic device. In some embodiments, the first electronic device can generate specific data according to the motion information detected by the motion sensor, and wirelessly broadcast or transmit the generated specific data. In other words, the specific information can comprise the specific data generated according to the motion information of the first electronic device. When the specific information in the first signal does not conform to the predefined information (No in step S610), the procedure is completed. When the specific information in the first signal conforms to the predefined information (Yes in step S610), in step S620, the identification data corresponding to the first electronic device in the first signal is recorded.

Figure 7:
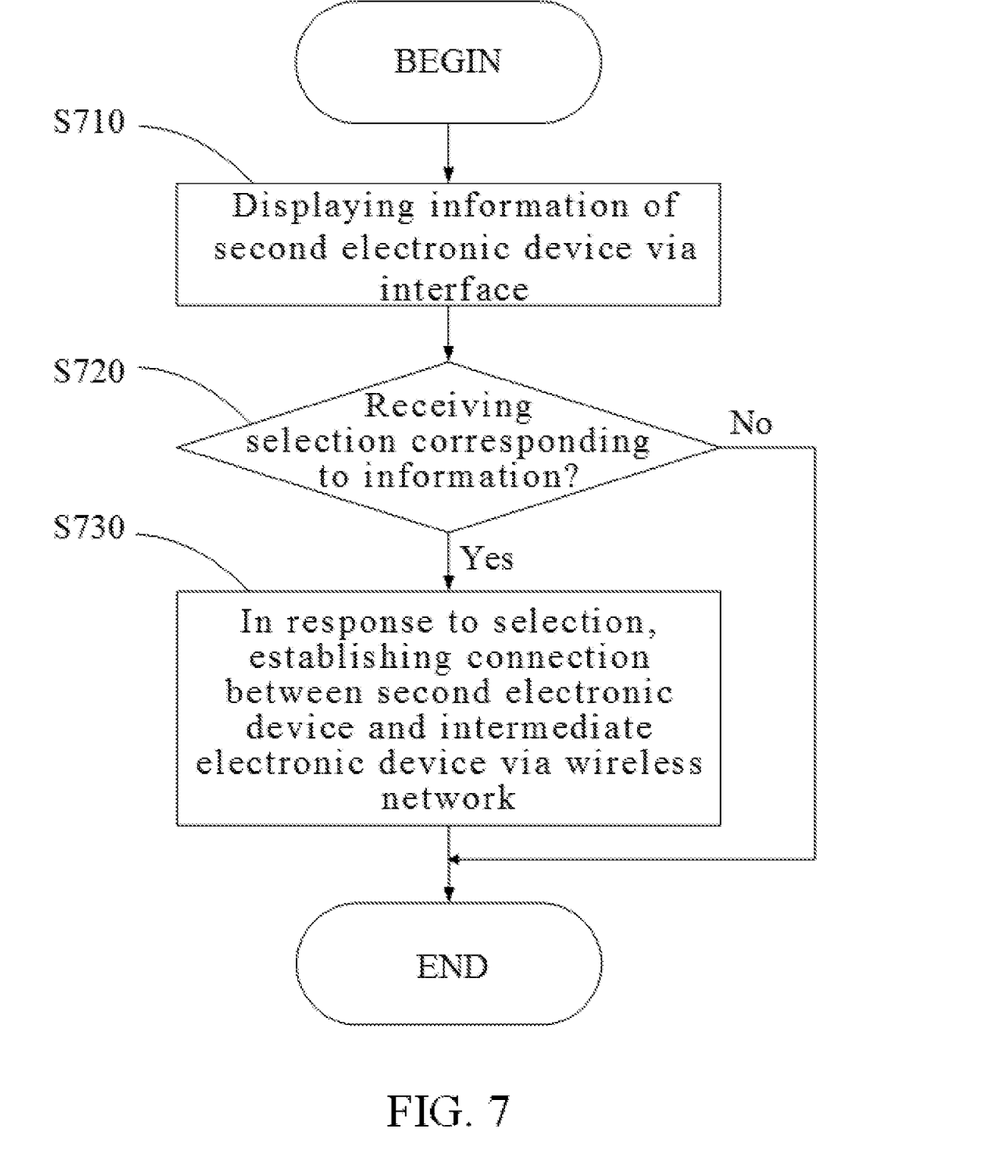
FIG. 7 is a flowchart of another embodiment of a method for registration management between electronic devices of the invention.

FIG. 7 is a flowchart of another embodiment of a method for registration management between electronic devices of the invention. The method for registration management between electronic devices can be used in an intermediate electronic device, such as a computer or a portable device, such as a mobile phone, a smart phone, a PDA, a GPS, a notebook, or a tablet computer. In the embodiment, the intermediate electronic device can connect to a second electronic device in response to an instruction received by the intermediate electronic device.

In step S710, information corresponding to the second electronic device is displayed via an interface of the intermediate electronic device. It is understood that, in some embodiments, the information corresponding to the second electronic device can be any data which can be used to identify the second electronic device, such as the identification data corresponding to the second electronic device and/or a name or code corresponding to the second electronic device. In step S720, it is determined whether a selection corresponding to the information of the second electronic device is received via the interface. When the selection corresponding to the information of the second electronic device is not received via the interface (No in step S720), the procedure is complete. When the selection corresponding to the information of the second electronic device is received via the interface (Yes in step S720), in step S730, in response to the selection, the intermediate electronic device establishes a connection between the second electronic device and the intermediate electronic device via a wireless network according to the identification data corresponding to the second electronic device.

Figure 8:
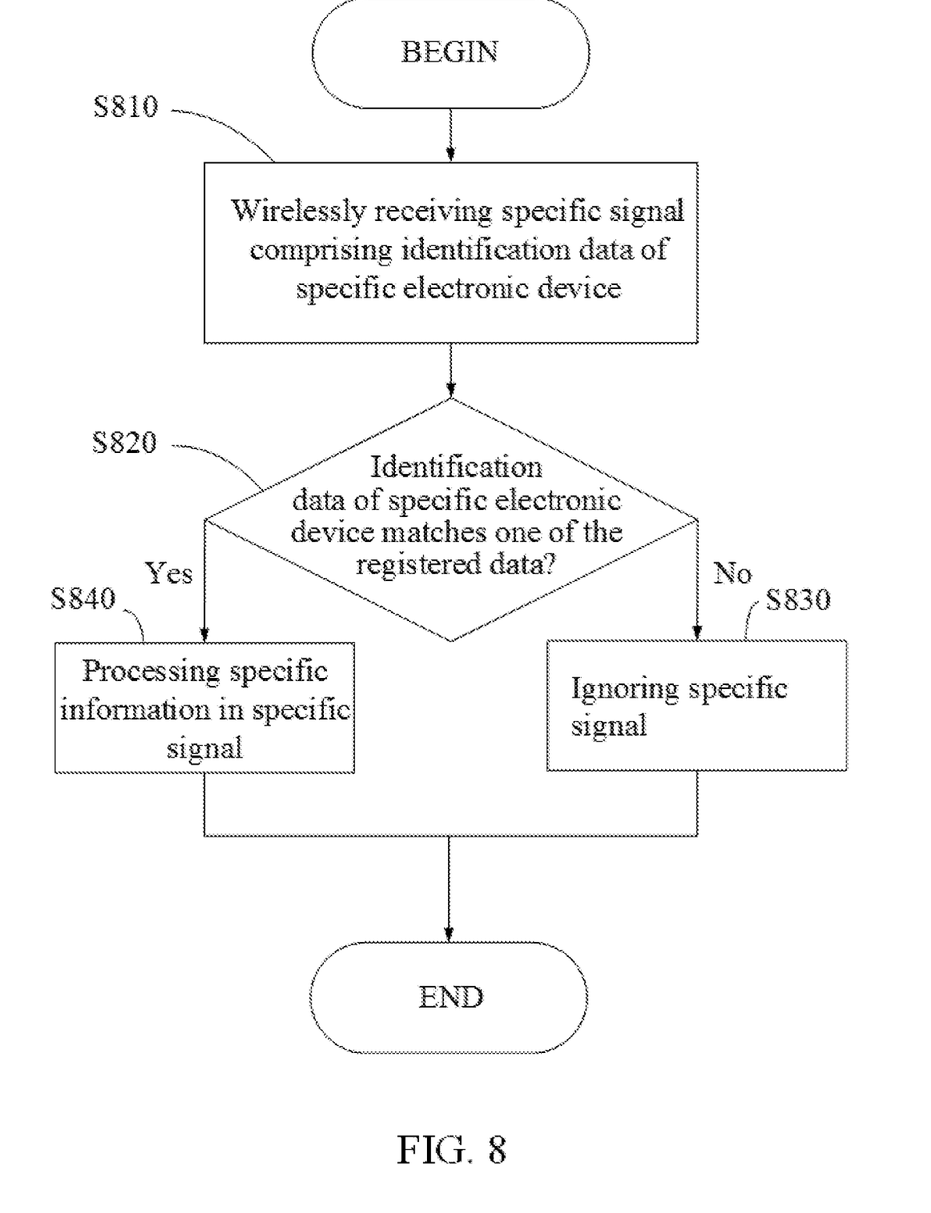
FIG. 8 is a flowchart of an embodiment of a method for processing detected signals of the invention.

FIG. 8 is a flowchart of an embodiment of a method for processing detected signals of the invention. The method for processing detected signals of the invention can be used in the above second electronic device.

In step S810, the second electronic device wirelessly receives a specific signal. It is noted that, the specific signal is broadcasted or transmitted by a specific electronic device, and the specific signal comprises identification data corresponding to the specific electronic device. It is understood that, in some embodiments, a wireless connecting unit of the second electronic device and a wireless connecting unit of the specific electronic device can respectively have a peripheral mode and a central mode. The specific electronic device broadcasts the specific signal in the peripheral mode, and the second electronic device receives the specific signal in the central mode. Then, in step S820, it is determined whether the identification data corresponding to the specific electronic device in the specific signal matches to one of the registered identification in the second electronic device. When the identification data corresponding to the specific electronic device in the specific signal does not match to one of the registered identification in the second electronic device (No in step S820), in step S830, the specific signal is ignored. As described, the second electronic device only performs further processes for the signals having the registered identification data. When the identification data corresponding to the specific electronic device in the specific signal matches to one of the registered identification in the second electronic device (Yes in step S820), in step S840, data in the specific signal is processed.

Figure 9:
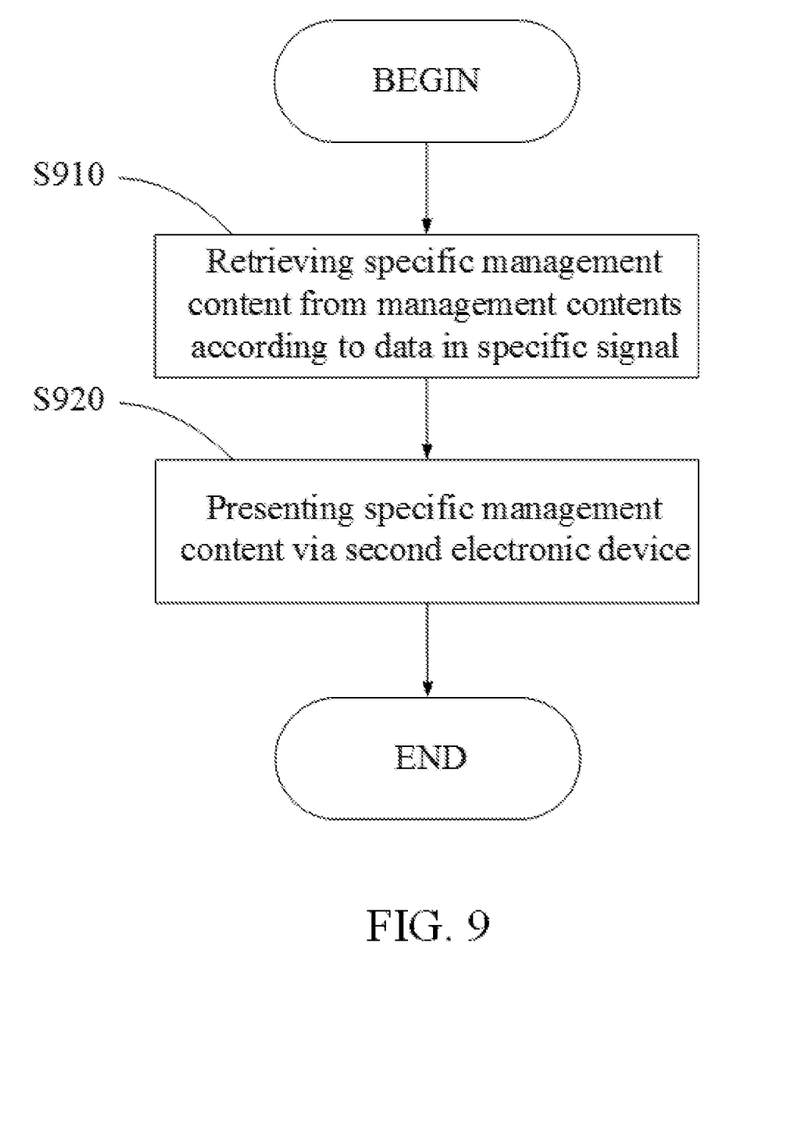
FIG. 9 is a flowchart of an embodiment of a method for processing data corresponding to specific signals of the invention.

FIG. 9 is a flowchart of an embodiment of a method for processing data corresponding to specific signals of the invention. The method for processing data corresponding to specific signals of the invention can be used in the above second electronic device.

In step S910, a specific management content is retrieved from a plurality of management contents according to data in the received specific signal. It is noted that, the data in the specific signal can comprise motion information of an electronic device which transmitting the signal, or specific data generated based on the motion information of the electronic device which transmitting the signal. Similarly, in some embodiments, the motion information comprises a specific motion or a specific posture detected by at least one motion sensor of the electronic device which transmitting the signal. It is understood that, in some embodiments, the second electronic device can have a table for recording the corresponding relationship between the data in the specific signal and the management contents. The second electronic device can retrieve a corresponding management content from the table according to the specific information. In step S920, the specific management content is presented via the second electronic device. It is understood that, in some embodiments, the specific management content can be displayed via a display unit of the second electronic device. In some embodiments, the specific management content can be generated and output via a sound output unit of the second electronic device. It is noted that, above presentation manners for the specific management content are examples of the application, and the present invention is not limited thereto.

Further, it is noted that, the embodiment of FIG. 9 is only an example of the application. Any process for the data in the specific signal can be also applied to the present invention.

For example, an intermediate electronic device can respectively register identification data corresponding to a plurality of target electronic devices to several wearable electronic devices. First, a user can instruct the respective target electronic device to generate a specific motion. At the time, the respective target electronic device can wirelessly broadcast a signal comprising the identification data corresponding to the respective target electronic device, and motion information corresponding to the specific motion or specific data generated based on the specific motion. After the intermediate electronic device receives the signal, it is determined whether the motion information or the specific data in the signal conforms to the predefined information preset in the intermediate electronic device. When the motion information or the specific data in the signal conforms to the predefined information preset in the intermediate electronic device, the identification data corresponding to the respective target electronic device is recorded in the intermediate electronic device. Then, the intermediate electronic device scans and receives signals broadcasted by the respective wearable electronic devices. When the intermediate electronic device receives a selection corresponding to at least one of the wearable electronic devices, the intermediate electronic device will connect to the selected wearable electronic device via a wireless network, and transmit the identification data corresponding to the respective target electronic devices to the wearable electronic device, thus to register the identification data corresponding to the respective target electronic devices in the wearable electronic device. After the registration, the selected wearable electronic device can perform subsequent processes for the signals with registered identification data.

Therefore, the methods and system for registration management between electronic devices of the present invention can register an electronic device to another electronic device via an intermediate electronic device, and perform related detection managements for the registered electronic devices, thereby the complexity of related operations, and improving the efficiency of device registration.

Methods for registration management between electronic devices, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for registration management between electronic devices for use in an intermediate electronic device, comprising:
    wirelessly receiving a first signal from at least one first electronic device, wherein the first signal is broadcasted by the first electronic device, and the first signal comprises the identification data corresponding to the first electronic device;
    determining whether specific information in the first signal conforms to predefined information, wherein the specific information comprises motion information corresponding to the first electronic device, or specific data generated according to the motion information;
    when the specific information in the first signal conforms to the predefined information, recording
    the identification data corresponding to the first electronic device in the first signal;
    wirelessly receiving a second signal from at least one second electronic device, wherein the second signal is broadcasted by the second electronic device, and the second signal comprises identification data corresponding to the second electronic device;
    establishing a connection between the second electronic device and the intermediate electronic device via a wireless network according to the identification data corresponding to the second electronic device; and
    transmitting the identification data corresponding to the first electronic device to the second electronic device via the wireless network, to register the identification data corresponding to the first electronic device in the second electronic device.

2. The method of claim 1, further comprising:
    displaying information corresponding to the second electronic device via an interface;
    receiving a selection corresponding to the information via the interface; and
    in response to the selection, establishing the connection between the second electronic device and the intermediate electronic device via the wireless network according to the identification data corresponding to the second electronic device, and transmitting the identification data corresponding to the first electronic device to the second electronic device via the wireless network.

3. The method of claim 1, wherein the second electronic device performs subsequent processes for the signals having the identification data which is registered in the second electronic device.

4. The method of claim 1, further comprising:
    wirelessly receiving a specific signal by the second electronic device, wherein the specific signal is broadcasted by a specific electronic device, and the specific signal comprises identification data corresponding to the specific electronic device;
    determining whether the identification data corresponding to the specific electronic device matches to one of the registered identification data in the second electronic device by the second electronic device;
    when the identification data corresponding to the specific electronic device does not match to one of the registered identification data in the second electronic device, ignoring the specific signal; and when the identification data corresponding to the specific electronic device matches to one of the registered identification data in the second electronic device, processing data in the specific signal.

5. The method of claim 4, wherein the method for processing the data in the specific signal comprises steps of:
retrieving a specific management content from a plurality of management contents according to the data in the specific signal; and
presenting the specific management content via the second electronic device.

6. The method of claim 5, wherein the specific electronic device comprises at least one motion sensor for detecting motion information corresponding to the specific electronic device, and the data in the specific signal is generated according to the motion information corresponding to the specific electronic device.

7. The method of claim 4, wherein a wireless connecting unit of the specific electronic device and a wireless connecting unit of the second electronic device respectively have a peripheral mode and a central mode, in which the specific electronic device broadcasts the specific signal in the peripheral mode, and the second electronic device receives the specific signal in the central mode.

8. A system for registration management between electronic devices for use in an intermediate electronic device, comprising:
a wireless transceiver wirelessly receiving a first signal from at least one first electronic device, wherein the first signal is broadcasted by the first electronic device, and the first signal comprises identification data corresponding to the first electronic device, wirelessly receiving a second signal from at least one second electronic device, wherein the second signal is broadcasted by the second electronic device, and the second signal comprises identification data corresponding to the second electronic device; and
a processing unit determining whether specific information in the first signal conforms to predefined information, wherein the specific information comprises motion information corresponding to the first electronic device, or specific data generated according to the motion information, when the specific information in the first signal conforms to the predefined information, recording the identification data corresponding to the first electronic device, establishing a connection between the second electronic device and the intermediate electronic device via a wireless network according to the identification data corresponding to the second electronic device, and transmitting the identification data corresponding to the first electronic device to the second electronic device via the wireless network, to register the identification data corresponding to the first electronic device in the second electronic device.

9. A non-transitory machine-readable storage medium comprising a computer program, which, when executed, causes a device to perform a method for registration management between electronic devices for use in an intermediate electronic device, wherein the method comprises:
wirelessly receiving a first signal from at least one first electronic device, wherein the first signal is broadcasted by the first electronic device, and the first signal comprises the identification data corresponding to the first electronic device;
determining whether specific information in the first signal conforms to predefined information, wherein the specific information comprises motion information corresponding to the first electronic device, or specific data generated according to the motion information;
when the specific information in the first signal conforms to the predefined information, recording the identification data corresponding to the first electronic device in the first signal;
wirelessly receiving a second signal from at least one second electronic device, wherein the second signal is broadcasted by the second electronic device, and the second signal comprises identification data corresponding to the second electronic device;
establishing a connection between the second electronic device and the intermediate electronic device via a wireless network according to the identification data corresponding to the second electronic device; and
transmitting the identification data corresponding to the first electronic device to the second electronic device via the wireless network, to register the identification data corresponding to the first electronic device in the second electronic device.

* * * * *